(12) United States Patent
Takahashi (10) Patent No.: US 10,179,554 B2
(45) Date of Patent: Jan. 15, 2019

(54) ELECTRIC WIRE HOLDER AND WIRE HARNESS

(71) Applicant: SUMITOMO WIRING SYSTEMS, LTD., Mie (JP)

(72) Inventor: Yuten Takahashi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 15/728,858

(22) Filed: Oct. 10, 2017

(65) Prior Publication Data

US 2018/0105123 A1 Apr. 19, 2018

(30) Foreign Application Priority Data

Oct. 14, 2016 (JP) ................................ 2016-202826

(51) Int. Cl.
| | | |
|---|---|---|
| *B60R 16/02* | (2006.01) | |
| *H01B 7/00* | (2006.01) | |
| *H02G 3/32* | (2006.01) | |
| *H01B 7/17* | (2006.01) | |

(52) U.S. Cl.
CPC ...... *B60R 16/0207* (2013.01); *B60R 16/0215* (2013.01); *H01B 7/0045* (2013.01); *H02G 3/32* (2013.01); *H01B 7/17* (2013.01)

(58) Field of Classification Search
CPC .................. B60R 16/0215; F16D 2125/62
See application file for complete search history.

(56) References Cited

U.S. PATENT DOCUMENTS

| | | | | |
|---|---|---|---|---|
| 3,661,233 | A * | 5/1972 | Margetts ................. | F16D 51/20 188/106 A |
| 5,905,231 | A * | 5/1999 | Houte ................. | B60R 16/0215 138/165 |
| 8,186,487 | B2 * | 5/2012 | Miura ..................... | F16D 65/18 188/72.9 |
| 2002/0151213 | A1 * | 10/2002 | Aoki ................... | B60R 16/0215 439/502 |
| 2002/0163415 | A1 | 11/2002 | Ide et al. | |
| 2002/0179378 | A1 * | 12/2002 | Jones ...................... | F16D 65/22 188/2 D |
| 2006/0053947 | A1 * | 3/2006 | Okamoto .............. | B60T 11/046 74/502.6 |
| 2007/0068743 | A1 * | 3/2007 | Tessitore ................. | F16D 65/22 188/2 D |
| 2013/0146354 | A1 * | 6/2013 | Shimada ............. | B60R 16/0215 174/72 A |

FOREIGN PATENT DOCUMENTS

JP        2002-325328        11/2002

* cited by examiner

*Primary Examiner* — Hung V Ngo
(74) *Attorney, Agent, or Firm* — Greenblum & Bernstein, P.L.C.

(57) ABSTRACT

An electric wire holder includes a fixed portion to be fixed to a support panel provided on a vehicle body and a holding portion that extends from one end of the fixed portion and is configured to hold an electric wire to be routed to an electric parking brake. The holding portion is provided with an opening for receiving the electric wire, the opening being open between a leading end of the holding portion and the one end of the fixed portion, and a recessed portion for accommodating the electric wire that has passed through the opening. In the recessed portion, a serration is formed on an inner surface at a position corresponding to a region to be crimped by a crimping tool.

6 Claims, 7 Drawing Sheets

ELECTRIC WIRE HOLDER AND WIRE HARNESS

TECHNICAL FIELD

The present invention relates to an electric wire holder that holds an electric wire to be routed to an electric parking brake (referred to as "EPB" hereinafter) of a vehicle, and a wire harness including the electric wire holder.

BACKGROUND ART

Conventionally, electric wire holders such as a fixing bracket are used in order to fix, to a vehicle body, an electric wire to be routed to an EPB of a vehicle. In general, as shown in a cross-sectional view in FIGS. 3A and 3B, an electric wire for an EPB includes a plurality of core wires 22 that are each coated with an inner insulating coating material 24, a relatively thick outer insulating coating material 26 that surrounds the plurality of core wires 22, and an intervening insulating material 28 that intervenes between the insulating coating materials 24 and the insulating coating material 26 (see JP 2002-325328A, for example).

Figure 7:
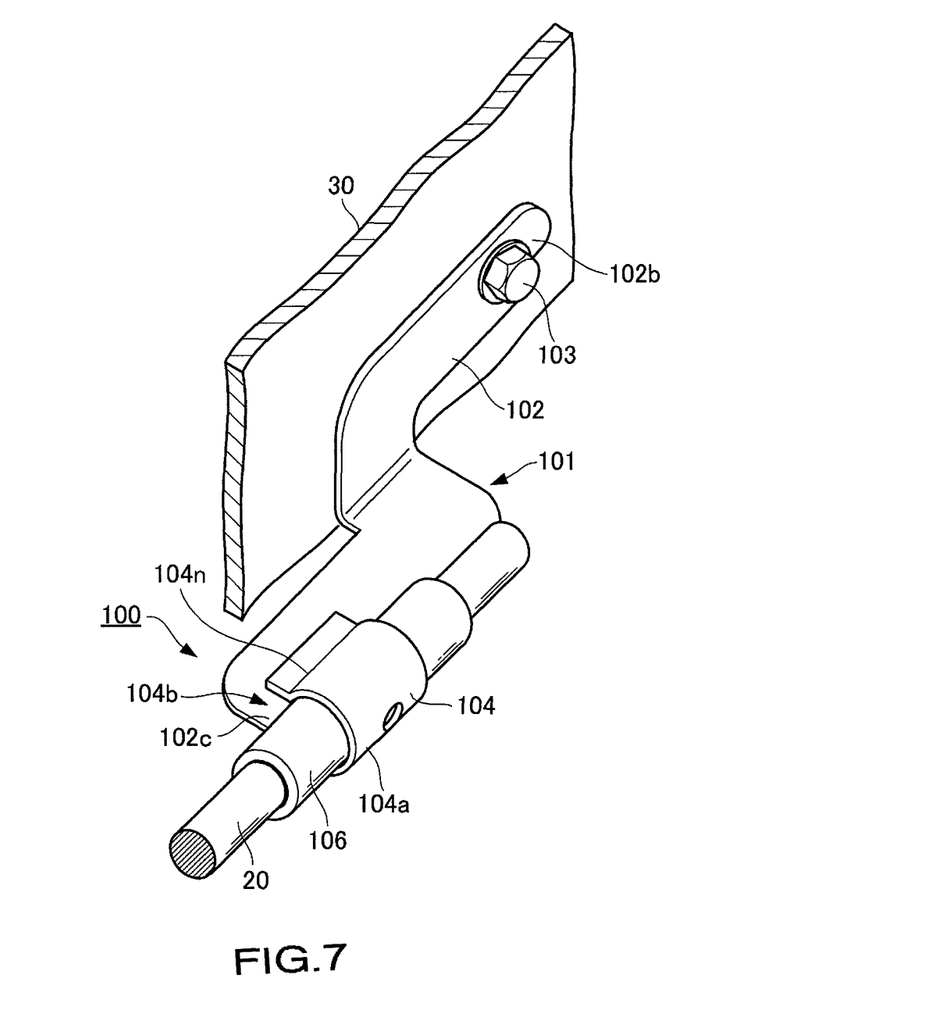
FIG. 7 is a perspective view showing a state in which a conventional electric wire holder holds an electric wire for an EPB.

FIG. 7 shows an example of a conventional electric wire holder 100 to be used for an electric wire 20 for an EPB. The electric wire holder 100 includes a fixing bracket 101, and a tubular rubber member 106 made of EPDM (ethylene-propylene-diene rubber) or the like. The fixing bracket 101 includes a plate-shaped fixed portion 102 whose one end 102b is to be fixed, with a bolt 103, to a support such as a support panel 30 provided on a vehicle body, and a holding portion 104 that extends from the other end 102c of the fixed portion 102 and is configured to hold the electric wire 20 for an EPB.

The holding portion 104 is provided with an opening 104b for receiving the tubular rubber member 106 through which the electric wire 20 for an EPB has been inserted, the opening 104b being open between the leading end 104n of the holding portion 104 and the above-mentioned other end 102c of the fixed portion 102, and a recessed portion 104a for accommodating the tubular rubber member 106 that has passed through the opening 104b. The holding portion 104 is crimped using a crimping tool, so that the diameter of the space in the recessed portion 104a is reduced, and the clearance of the opening 104b is made into a size such that the tubular rubber member 106 cannot dislodge. The tubular rubber member 106 deforms due to such crimping and comes into intimate contact with the electric wire 20 for an EPB, thus making it less likely that the electric wire 20 for an EPB laterally shifts relative to the fixing bracket 101 in the longitudinal direction.

JP 2002-325328A is an example of related art.

SUMMARY OF THE INVENTION

However, the conventional electric wire holder 100 shown in FIG. 7 requires the tubular rubber member 106 in addition to the fixing bracket 101, which causes an increase in component cost. Moreover, it is necessary to bring the electric wire 20 for an EPB into intimate contact with the inside of the tubular rubber member 106, and therefore, the outer diameter of the electric wire 20 for an EPB is set to be substantially the same as the tube inner diameter of the tubular rubber member 106. As a result, a frictional force is generated between the electric wire 20 for an EPB and the tubular rubber member 106, thus making it difficult to move the tubular rubber member 106 to a predetermined position in the electric wire 20 for an EPB. Furthermore, when the fixing bracket 101 is attached to the electric wire 20 for an EPB, it is necessary to position not only the tubular rubber member 106 with respect to the fixing bracket 101 but also the fixing bracket 101 with respect to the electric wire 20 for an EPB, and thus the attaching operation becomes difficult.

The present invention was achieved in order to solve the above-described conventional problems, and it is an object thereof to provide an electric wire holder that can use a small number of components to reliably hold an electric wire for an EPB and can be easily attached to the electric wire for an EPB, and a wire harness including the electric wire holder.

In order to achieve the aforementioned object, an electric wire holder according to the present invention includes a fixed portion to be fixed to a support provided on a vehicle body, and a holding portion that extends from one end of the fixed portion and is configured to hold an electric wire to be routed to an electric parking brake, wherein the holding portion is provided with an opening for receiving the electric wire, the opening being open between a leading end of the holding portion and the one end of the fixed portion, and a recessed portion for accommodating the electric wire that has passed through the opening, and in the recessed portion, a serration is formed on an inner surface at a position corresponding to a region to be crimped by a crimping tool.

As described above, with the electric wire holder according to the present invention, in the recessed portion of the holding portion, the serration is formed on the inner surface at the position corresponding to the region to be crimped using a crimping tool, thus making it possible to allow a pressing force generated by the crimping tool to act directly on the outer surface of the holding portion at the position corresponding to the serration. This allows protrusions in the serration on the inner surface of the holding portion to engage with an outer insulating coating material of an electric wire for an EPB, and thus the electric wire for an EPB can be reliably held without lateral shifts in the longitudinal direction.

Moreover, since a tubular rubber member that has been used conventionally becomes unnecessary, the number of components decreases compared to a conventional case, and thus component cost can be reduced. Furthermore, with the electric wire holder according to the present invention, as compared to a conventional case, it is unnecessary to insert the electric wire for an EPB into the tubular rubber member in advance, and it is also unnecessary to position the tubular rubber member. Therefore, the electric wire holder can be easily attached to the electric wire for an EPB.

Accordingly, the electric wire holder according to the present invention can use a small number of components to reliably hold the electric wire for an EPB and can be easily attached to the electric wire for an EPB.

The electric wire holder according to the present invention may also have a configuration in which the serration includes a plurality of grooves extending in parallel with a direction orthogonal to a width direction of the holding portion.

With this configuration, the plurality of grooves and the protrusions between the grooves extending in parallel with the direction orthogonal to the width direction of the holding portion, that is, a direction orthogonal to the longitudinal direction of the electric wire for an EPB that is being held, are formed, thus making it possible to effectively prevent lateral shifts of the electric wire for an EPB in the longitudinal direction.

The electric wire holder according to the present invention may also have a configuration in which the serration includes grooves forming a lattice.

With this configuration, it is possible to effectively prevent not only lateral shifts of the electric wire for an EPB in the longitudinal direction but also rotations of the electric wire for an EPB around an axis extending in the longitudinal direction.

The electric wire holder according to the present invention may also have a configuration in which the serration includes a plurality of triangular holes, and projections that rise from edges of the holes.

With this configuration, it is possible to cause the projections to firmly engage with the outer insulating coating material of the electric wire for an EPB, and thus the electric wire for an EPB can be stably held with the above-mentioned lateral shifts and rotations being prevented.

A wire harness according to the present invention includes an electric wire to be routed to an electric parking brake, and any of the above-described electric wire holders, wherein the electric wire holder holds the electric wire.

With the present invention, an electric wire holder that can use a small number of components to reliably hold an electric wire for an EPB and can be easily attached to the electric wire for an EPB, and a wire harness including the electric wire holder can be provided.

BRIEF DESCRIPTION OF THE DRAWINGS

FIGS. 3A and 3B are cross-sectional views taken along line in FIG. 2, where

FIGS. 4A and 4B show a serration according to the first embodiment of the present invention, where

FIGS. 5A and 5B show a serration according to a second embodiment of the present invention, where

FIGS. 6A to 6C show a serration according to a third embodiment of the present invention, where

EMBODIMENTS OF THE INVENTION

Hereinafter, embodiments according to the present invention will be described with reference to the drawings.

First Embodiment

Figure 1:
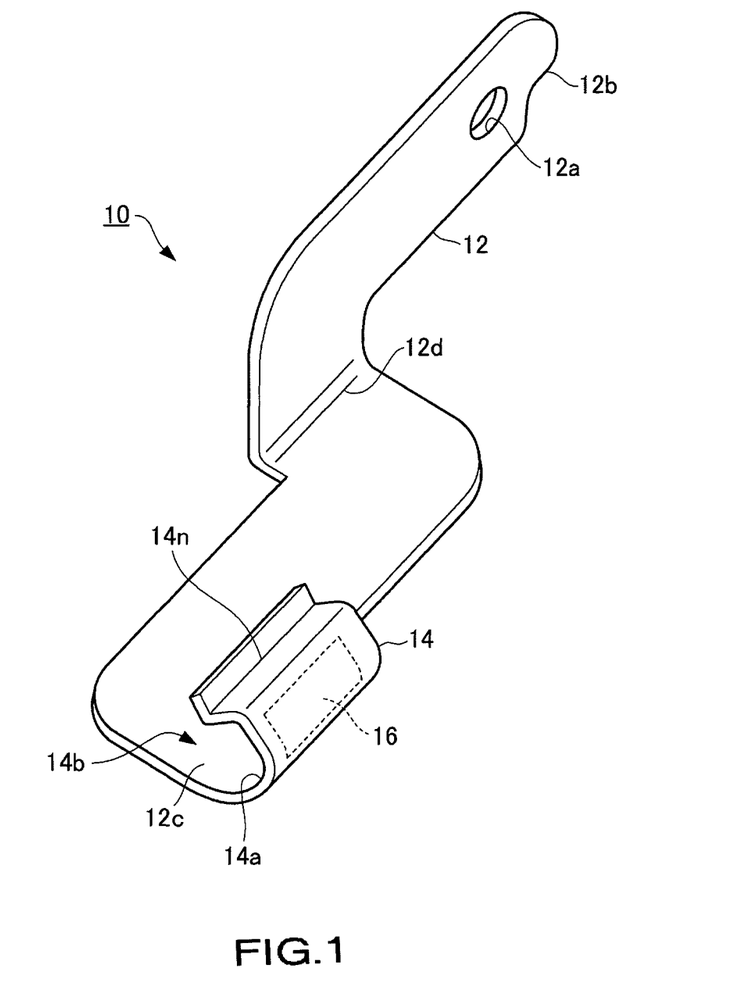
FIG. 1 is a perspective view of an electric wire holder according to a first embodiment of the present invention.
Figure 2:
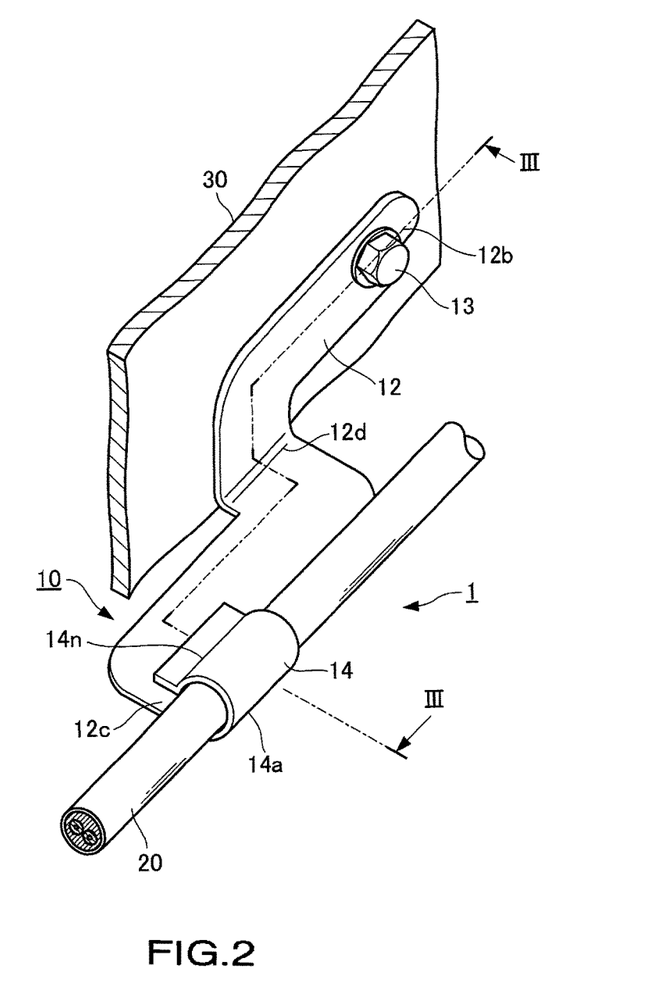
FIG. 2 is a perspective view showing a state in which the electric wire holder according to the first embodiment of the present invention holds an electric wire for an EPB.

An electric wire holder 10 according to a first embodiment is configured to hold an electric wire 20 to be routed to an EPB of an automobile and to be fixed to a support panel 30, which is a support on a vehicle body side. Specifically, as shown in FIGS. 1 and 2, the electric wire holder 10 according to this embodiment includes a fixed portion 12 to be fixed to the support panel 30 provided on the vehicle body, and a holding portion 14 that extends from one end 12c of the fixed portion 12 and is configured to hold the electric wire 20 to be routed to an EPB. The electric wire holder 10 can be manufactured by punching, bending, or drilling a metal plate, for example.

Figure 3A:
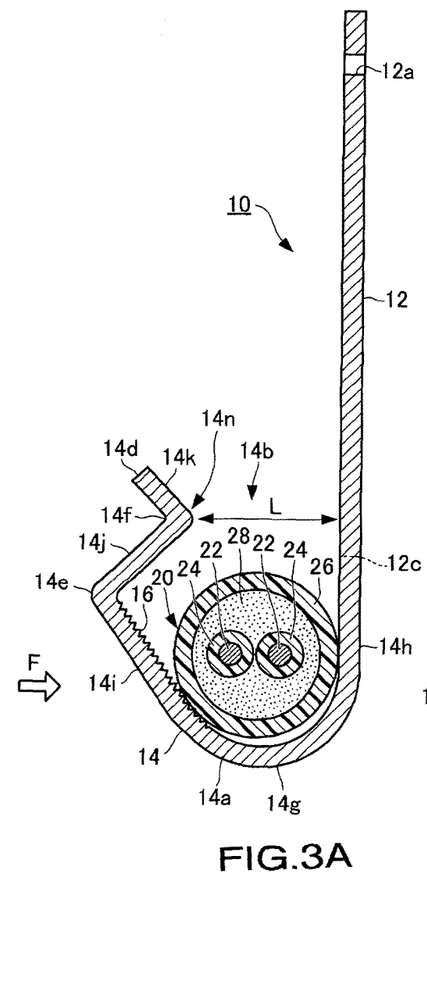
FIG. 3A shows a state before a holding portion is crimped.
Figure 3B:
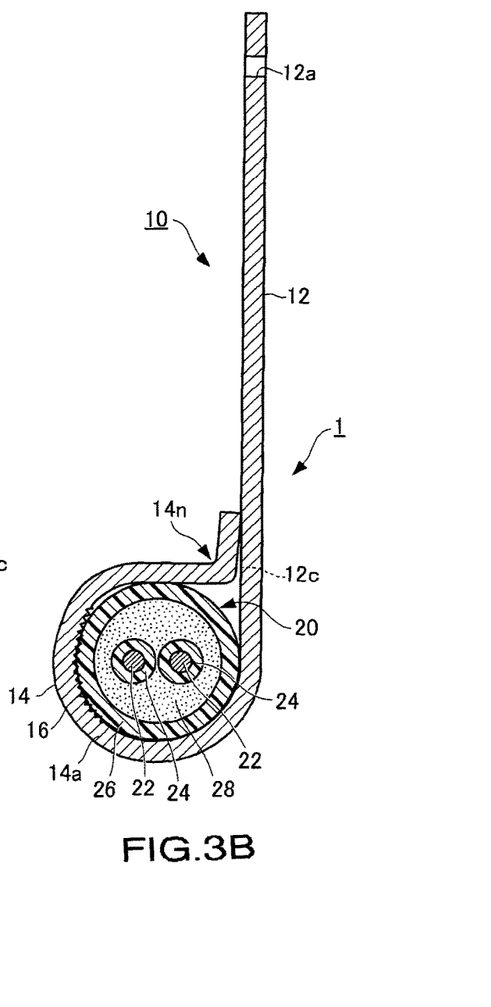
FIG. 3B shows a state after the holding portion is crimped.

As shown in FIGS. 3A and 3B, the electric wire 20 for an EPB has a configuration in which two core wires 22 that are each coated with an inner insulating coating material 24 made of polyethylene, for example, are surrounded by a relatively thick outer insulating coating material 26 made of polyurethane, for example. An intervening insulating material 28 made of polyethylene, for example, intervenes between the inner insulating coating material 24 for the core wire and the outer insulating coating material 26. The electric wire 20 for an EPB may also have a configuration in which a shield coating material such as a metal mesh or a metal foil is provided between the intervening insulating material 28 and the outer insulating coating material 26.

In this embodiment, the electric wire 20 for an EPB includes two core wires 22, but the number of the core wires is not limited thereto, and a signal wire for an ABS (anti-lock brake system), and the like may be included additionally.

As shown in FIGS. 1 and 2, the fixed portion 12 is a metal bracket in the shape of a plate bent at a right angle at a bending portion 12d located substantially at a center, and an attachment hole 12a is provided at an end 12b. The attachment hole 12a can be utilized to fix the fixed portion 12 to the support panel 30 on the vehicle body side using a fastening member such as a bolt 13 or a screw.

As shown in FIGS. 1 and 3A, the holding portion 14 is provided with an opening 14b for receiving the electric wire 20 for an EPB, the opening 14b being open between a leading end 14n of the holding portion 14 and the end 12c of the fixed portion 12, and a recessed portion 14a for accommodating the electric wire 20 for an EPB that has passed through the opening 14b. The holding portion 14 is a metal band plate member extending from the end 12c of the fixed portion 12, and is curved at a curved portion 14g and bent back to form the recessed potion 14a. A portion between the end 12c of the fixed portion 12 and the curved portion 14g corresponds to a first flat portion 14h having a substantially flat shape, and a portion between the curved portion 14g and a first bending portion 14e corresponds to a second flat portion 14i having a substantially flat shape. A portion between the first bending portion 14e and a second bending portion 14f corresponds to a third flat portion 14j having a flat shape, and a portion between the second bending portion 14f and a leading end 14d corresponds to a fourth flat portion 14k having a substantially flat shape.

Specifically, the leading end 14n of the holding portion 14 corresponds to a portion between a portion near the second bending portion 14f in the third flat portion 14j and the leading end 14d. The opening 14b may also be formed between the leading end 14n of the holding portion 14 and a base of the holding portion 14. The width L of the opening 14b is substantially the same as the outer diameter of the electric wire 20 for an EPB, but, when the clearance of the opening 14b can be widened easily, the width L of the opening 14b may be smaller than the outer diameter of the electric wire 20 for an EPB to some extent.

Although the first to fourth flat portions 14h, 14i, 14j and 14k having a flat shape are provided in this embodiment, there is no limitation to this shape, and some or all of the first to fourth flat portions 14h, 14i, 14j and 14k may be curved. In a word, it is sufficient if a configuration is adopted in which the recessed portion 14a capable of accommodating the electric wire 20 for an EPB is formed. Although the fourth flat portion 14k is inclined such that a distance to the fixed portion 12 increases toward the leading end, and thus facilitates the accommodation of the electric wire 20 for an EPB, the fourth flat portion 14k may be omitted as necessary.

Although the length from the base of the holding portion 14 to the second bending portion 14f, which defines the width L of the opening 14b, is substantially the same as the outer circumference of the electric wire 20 for an EPB, the length of the holding portion 14 is not limited thereto. As long as the clearance of the opening 14b of the holding portion 14 can be made smaller than the outer diameter of the electric wire 20 for an EPB due to crimping, thus making it possible to prevent the electric wire 20 for an EPB from dislodging through the opening 14b, the length from the base of the holding portion 14 to the second bending portion 14f may be made shorter than the outer circumference of the electric wire 20 for an EPB.

As shown in FIGS. 3A and 3B, in the recessed portion 14a of the holding portion 14, a serration 16 is formed on the inner surface at the position corresponding to the region to be crimped using a crimping tool. Specifically, the serration 16 is provided on the inner surface of the second flat portion 14i of the holding portion 14 over the entire width thereof. A serration 16 may be additionally provided on the inner surface of the first flat portion 14h. A pressing force F generated by the crimping tool acts directly on the second flat portion 14i during crimping, and therefore, the serration 16 is formed on the inner surface of the second flat portion 14i, so that it is possible to cause protrusions 16b having edges 16c in the serration 16 to engage with the hard insulating coating material 26 provided on the outside of the electric wire 20 for an EPB. In a word, when the serration 16 is formed on the inner surface of the holding portion 14 at the position corresponding to the region on which a pressing force generated by the crimping tool directly acts, the protrusions 16b in the serration 16 are caused to reliably engage with the outer insulating coating material 26 of the electric wire 20 for an EPB.

Figure 4A:
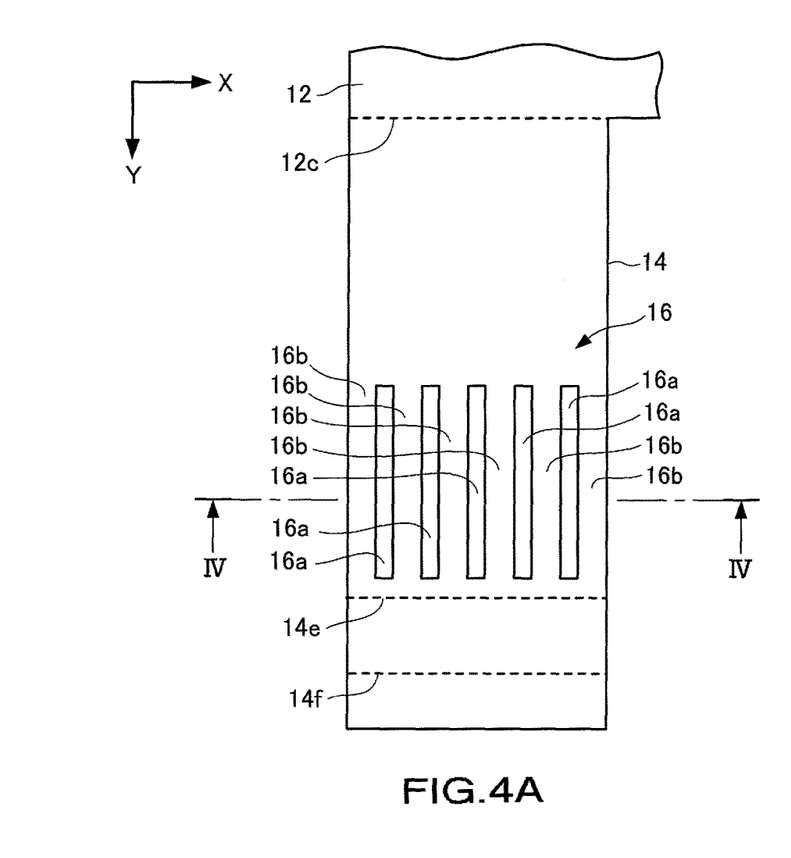
FIG. 4A is a developed view of the holding portion.
Figure 4B:
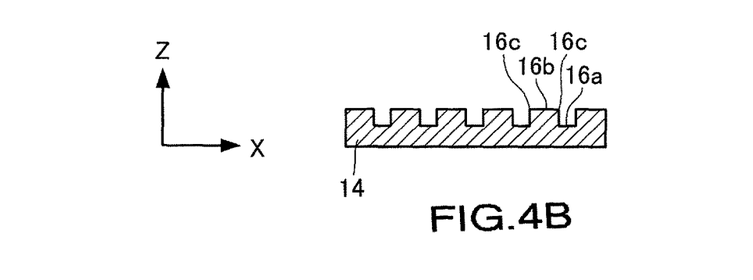
FIG. 4B is a cross-sectional view taken along line IV-IV in FIG. 4A.

FIG. 4A is a developed (unfolded) view of the holding portion 14, and FIG. 4B is a cross-sectional view taken along line IV-IV in FIG. 4A. As shown in FIGS. 4A and 4B, the serration 16 includes a plurality of grooves 16a extending in parallel with a direction Y orthogonal to a width direction X of the holding portion 14. The plurality of grooves 16a are formed on the inner surface of the second flat portion 14i over the entire width thereof. The number of the grooves 16a, the pitches between the grooves, the length, width, and depth of each of the grooves 16a, and the like can be set as desired in accordance with a magnitude of force required to hold the electric wire 20 for an EPB. As shown in FIG. 4B, protrusions 16b are formed between the grooves 16a, and angular edges 16c are formed at the upper end edges of the protrusions 16b. The edges 16c have a function of preventing the protrusions 16b from shifting laterally after engaging with the outer insulating coating material 26 of the electric wire 20 for an EPB.

The developed view in FIG. 4A shows that each of the grooves 16a in the serration 16 according to this embodiment is formed as a linear groove, but there is no limitation to this shape, and the grooves 16a may also have a zigzag shape or a wave shape. Moreover, in the cross-sectional view in FIG. 4B, both side walls in each groove may also be inclined such that the distance therebetween increases upward, resulting in a decrease in the width of the top surface of the protrusion 16b formed between the grooves, thus facilitating the engagement of the protrusions 16b with the outer insulating coating material 26 of the electric wire 20 for an EPB. Although the serration 16 according to this embodiment includes the plurality of grooves 16a, a plurality of elongated protruding structures may also be provided instead of the grooves 16a.

Next, a method of attaching the electric wire holder 10 according to the present invention to the electric wire 20 for an EPB will be described.

As shown in FIG. 3A, the electric wire 20 for an EPB is passed through the opening 14b and accommodated in the interior of the recessed portion 14a, and then the holding portion 14 is crimped by applying a pressing force F to the outer surface of the second flat portion 14i using a crimping tool. As shown in FIG. 3B, the holding portion 14 is crimped using a crimping tool, so that the diameter of the space in the recessed portion 14a is reduced, and the clearance of the opening 14b of the holding portion 14 is reduced into a size such that the electric wire 20 for an EPB cannot dislodge. At this time, as shown in FIG. 3B, the serration 16 on the inner surface of the second flat portion 14i of the holding portion 14 is pressed against the outer insulating coating material 26 of the electric wire 20 for an EPB, and the protrusions 16b in the serration 16 firmly engage with the outer insulating coating material 26. In the serration 16, the grooves 16a have a shape and dimensions such that the protrusions 16b having the edges 16c that have engaged with the outer insulating coating material 26 may reach the intervening insulating material 28 that is present inside, but cannot reach the insulating coating material 24 of the core wires 22.

Next, the operational effects will be described.

With the electric wire holder 10 according to the first embodiment of the present invention, in the recessed portion 14a of the holding portion 14, the serration 16 is formed on the inner surface at the position corresponding to the region to be crimped using a crimping tool, thus making it possible to allow a pressing force F generated by a crimping tool to act directly on the outer surface of the holding portion 14 at the position corresponding to the serration 16. This allows protrusions 16b of the serration 16 on the inner surface of the holding portion to engage with an outer insulating coating material 26 of an electric wire 20 for an EPB, and thus the electric wire 20 for an EPB can be reliably held without lateral shifts in the longitudinal direction.

Moreover, since a tubular rubber member that has been used conventionally becomes unnecessary, the number of components decreases compared to a conventional case, and thus component cost can be reduced. Furthermore, with the electric wire holder 10 according to the embodiment of the present invention, as compared to a conventional case, it is unnecessary to insert the electric wire 20 for an EPB into the tubular rubber member in advance, and it is also unnecessary to position the tubular rubber member. Therefore, the electric wire holder 10 can be easily attached to the electric wire 20 for an EPB. Accordingly, the electric wire holder 10 according to the embodiment of the present invention can use a small number of components to reliably hold the electric wire 20 for an EPB and can be easily attached to the electric wire 20 for an EPB.

In addition, as described above, the serration 16 of the electric wire holder 10 according to the embodiment of the present invention includes a plurality of grooves 16a extending in parallel with the direction Y orthogonal to the width direction X of the holding portion 14. With this configuration, the plurality of grooves 16a and the protrusions 16b between the grooves extending in parallel with the direction Y orthogonal to the width direction of the holding portion 14, that is, a direction orthogonal to the longitudinal direction of the electric wire for 20 an EPB that is being held, are formed, thus making it possible to effectively prevent lateral shifts of the electric wire 20 for an EPB in the longitudinal direction.

Second Embodiment

Next, an electric wire holder according to a second embodiment of the present invention will be described.

The electric wire holder according to the second embodiment has configurations similar to those of the above-described electric wire holder 10 according to the first embodiment other than the configuration of the serration 16, and therefore, description of the similar configurations will be omitted.

Figure 5A:
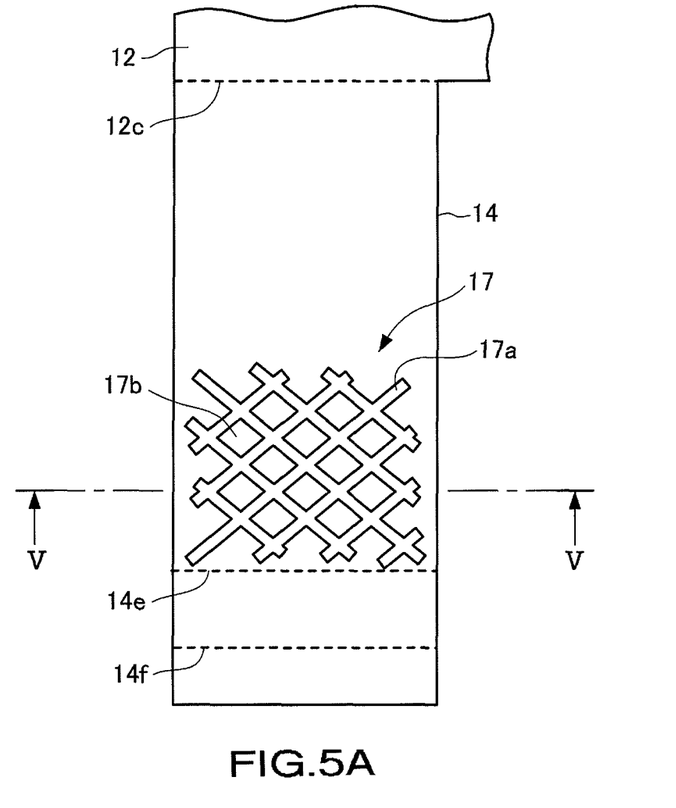
FIG. 5A is a developed view of the holding portion.
Figure 5B:
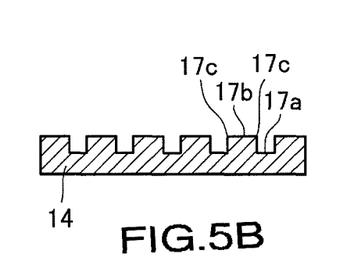
FIG. 5B is a cross-sectional view taken along line V-V in FIG. 5A.

FIG. 5A is a developed view of the holding portion 14, and FIG. 5B is a cross-sectional view taken along line V-V in FIG. 5A. As shown in FIGS. 5A and 5B, a serration 17 according to this embodiment includes grooves 17a forming a lattice. The grooves 17a forming a lattice are formed on the inner surface of the second flat portion 14i of the holding portion 14 over the entire width thereof. The number of the grooves 17a, the pitches between the grooves, the length, width, and depth of each of the grooves 17a, and the like can be set as desired in accordance with a magnitude of force required to hold the electric wire 20 for an EPB. As shown in FIG. 5B, protrusions 17b are formed between the grooves 17a, and angular edges 17c at the upper end edges of the protrusions 17b form a lattice.

When the electric wire 20 for an EPB is passed through the opening 14b and accommodated in the interior of the recessed portion 14a, as shown in FIGS. 3A and 3b, and then the holding portion 14 is crimped using a crimping tool, the protrusions 17b having the edges 17c forming a lattice in the serration 17 formed on the inner surface of the second flat portion 14i of the holding portion 14 engage with the outer insulating coating material 26 of the electric wire 20 for an EPB, and thus the electric wire 20 for an EPB can be firmly held.

As described above, the serration 17 of the electric wire holder according to the second embodiment includes the grooves 17a forming a lattice, thus making it possible to effectively prevent not only lateral shifts of the electric wire 20 for an EPB in the longitudinal direction but also rotations of the electric wire 20 for an EPB around an axis extending in the longitudinal direction.

Third Embodiment

Next, an electric wire holder according to a third embodiment of the present invention will be described.

The electric wire holder according to the third embodiment has configurations similar to those of the above-described electric wire holder 10 according to the first embodiment except the configuration of a serration 18, and therefore, description of the similar configurations will be omitted.

Figure 6A:
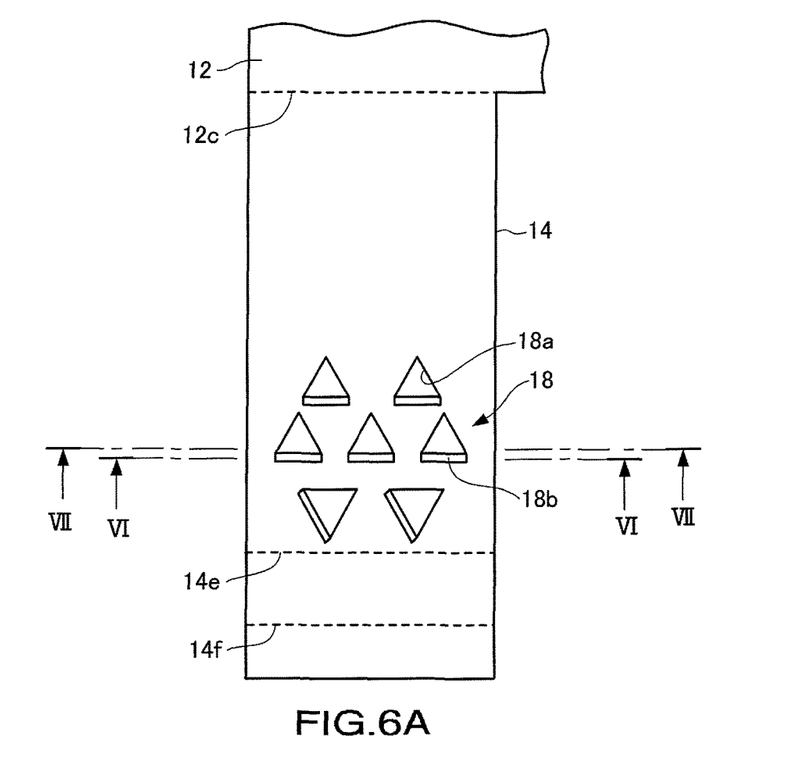
FIG. 6A is a developed view of the holding portion.
Figure 6B:
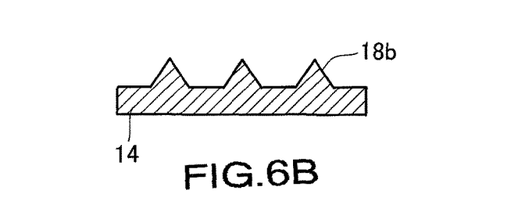
FIG. 6B is a cross-sectional view taken along line VI-VI in FIG. 6A.
Figure 6C:
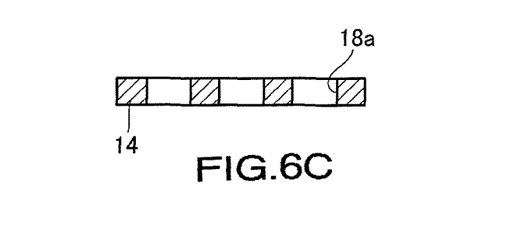
FIG. 6C is a cross-sectional view taken along line VII-VII in FIG. 6A.

FIG. 6A is a developed view of the holding portion 14, FIG. 6B is a cross-sectional view taken along line VI-VI in FIG. 6A, and FIG. 6C is a cross-sectional view taken along line VII-VII. As shown in FIGS. 6A to 6C, the serration 18 according to this embodiment is provided with a plurality of triangular holes 18a, and projections 18b that rise from edges of the holes 18a. The plurality of triangular holes 18a are formed on the inner surface of the second flat portion 14i over the entire width thereof. The number of the holes 18a, the pitches between the holes, the size of each of the holes 18a, the arrangement of the holes 18a, and the like can be set as appropriate in accordance with a magnitude of force required to hold the electric wire 20 for an EPB.

As shown in FIGS. 6A and 6B, the triangular holes 18a and the projections 18b are formed by making cuts that pass through the holding portion 14 at positions corresponding to two sides of a triangle to be formed into the hole 18a on the inner surface of the holding portion 14 and causing the triangular piece to rise from the remaining side. Therefore, the holes 18a are through holes as shown in FIG. 6C. Although the projections 18b may be formed on any one of the sides of the triangular hole 18a, the projections 18b may be arranged lined up in a specific direction or arranged at random in accordance with a magnitude of force required to hold the electric wire 20 for an EPB.

As shown in FIGS. 3A and 3B, when the electric wire 20 for an EPB is passed through the opening 14b and accommodated in the interior of the recessed portion 14a of the holding portion 14, and then the holding portion 14 is crimped using a crimping tool, the projections 18b in the serration 18 formed on the inner surface of the second flat portion 14i of the holding portion 14 engage with the outer insulating coating material 26 of the electric wire 20 for an EPB, and thus the electric wire 20 for an EPB can be firmly held.

As described above, the serration 18 of the electric wire holder according to the third embodiment includes the plurality of triangular holes 18a and the projections 18b that each rise from one side edge of the hole 18a. Therefore, it is possible to cause the triangular pointed projections 18b to firmly engage with the outer insulating coating material 26 of the electric wire 20 for an EPB, and thus the electric wire 20 for an EPB can be stably held with lateral shifts and rotations being prevented.

Moreover, as shown in FIG. 2, a wire harness 1 according to an embodiment of the present invention includes the electric wire 20 for an EPB to be routed to an EPB, and any of the above-described electric wire holders, and the electric wire holder holds the electric wire 20 for an EPB.

As described above, the present invention can use a small number of components to reliably hold an electric wire for an EPB and can be easily attached to the electric wire for an EPB, and thus is useful for an electric wire holder and a wire harness including the electric wire holder in general.

LIST OF REFERENCE NUMERALS

1 Wire harness
10 Electric wire holder
12 Fixed portion
14 Holding portion
14a Recessed portion
14b Opening
16 Serration (first embodiment)
16a Groove
17 Serration (second embodiment)
17a Groove
18 Serration (third embodiment)
18a Hole
18b Projection
20 Electric wire
30 Support panel (support)

What is claimed is:

1. An electric wire holder comprising:
a fixed portion configured to be fixed to a support provided on a vehicle body; and
a holding portion extending from one end of the fixed portion and configured to hold an electric wire to be routed to an electric parking brake,
wherein the holding portion includes an opening configured to receive the electric wire, the opening being open between a leading end of the holding portion and the one end of the fixed portion, and a recessed portion configured to accommodate the electric wire that has passed through the opening, and
a serration is formed on an inner surface of the recessed portion at a position corresponding to a region to be crimped by a crimping tool,
wherein the serration includes a plurality of grooves extending in parallel with a direction orthogonal to a width direction of the holding portion,
each groove including a bottom wall and a pair of side walls.

2. A wire harness comprising:
an electric wire to be routed to an electric parking brake; and
the electric wire holder according to claim 1,
wherein the electric wire holder holds the electric wire.

3. An electric wire holder comprising:
a fixed portion configured to be fixed to a support provided on a vehicle body; and
a holding portion extending from one end of the fixed portion and configured to hold an electric wire to be routed to an electric parking brake,
wherein the holding portion includes an opening configured to receive the electric wire, the opening being open between a leading end of the holding portion and the one end of the fixed portion, and a recessed portion configured to accommodate the electric wire that has passed through the opening, and
a serration is formed on an inner surface of the recessed portion at a position corresponding to a region to be crimped by a crimping tool,
wherein the serration includes grooves forming a lattice.

4. A wire harness comprising:
an electric wire to be routed to an electric parking brake; and
the electric wire holder according to claim 3,
wherein the electric wire holder holds the electric wire.

5. An electric wire holder comprising:
a fixed portion configured to be fixed to a support provided on a vehicle body; and
a holding portion extending from one end of the fixed portion and configured to hold an electric wire to be routed to an electric parking brake,
wherein the holding portion includes an opening configured to receive the electric wire, the opening being open between a leading end of the holding portion and the one end of the fixed portion, and a recessed portion configured to accommodate the electric wire that has passed through the opening, and
a serration is formed on an inner surface of the recessed portion at a position corresponding to a region to be crimped by a crimping tool,
wherein the serration includes a plurality of triangular holes, and projections that rise from edges of the holes.

6. A wire harness comprising:
an electric wire to be routed to an electric parking brake; and
the electric wire holder according to claim 5,
wherein the electric wire holder holds the electric wire.

* * * * *